United States Patent [19]

Harbison et al.

[11] Patent Number: 4,546,518
[45] Date of Patent: Oct. 15, 1985

[54] ATTACK ANGLE COMPENSATOR CONNECTOR

[75] Inventors: William H. Harbison; Andrew Frankus, both of Valparaiso, Ind.

[73] Assignee: The Anderson Company of Indiana, Michigan City, Ind.

[21] Appl. No.: 586,634

[22] Filed: Mar. 6, 1984

[51] Int. Cl.⁴ .............................. A47L 1/02; B60S 1/40
[52] U.S. Cl. ............................... 15/250.23; 15/250.32
[58] Field of Search ........... 15/250.21, 250.23, 250.31, 15/250.32–250.42

[56] References Cited

U.S. PATENT DOCUMENTS

| 2,915,769 | 12/1959 | Ryck | 15/250.33 |
| 3,128,490 | 4/1964 | Alfieri | 15/250.23 |
| 3,393,421 | 7/1968 | Wise | 15/250.32 X |
| 3,405,421 | 10/1968 | Tomlin | 15/250.33 X |
| 3,440,678 | 4/1969 | Tibbet | 15/250.33 X |
| 3,600,739 | 8/1971 | Mower | 15/250.23 |

FOREIGN PATENT DOCUMENTS 1210495  9/1959  France ............................... 15/250.33

Primary Examiner—Peter Feldman
Attorney, Agent, or Firm—Wood, Dalton, Phillips, Mason & Rowe

[57] ABSTRACT

According to the invention, an improved connector is provided between a windshield wiper arm and blade. The wiper arm has a trunnion member which cooperates with a cam surface on a socket associated with the wiper blade. Upon relatively rotating the wiper arm and blade, the trunnion travels along the cam surface and causes the blade to be conformingly reoriented relative to the windshield. The cam surface is chosen depending upon the configuration of the windshield.

11 Claims, 7 Drawing Figures

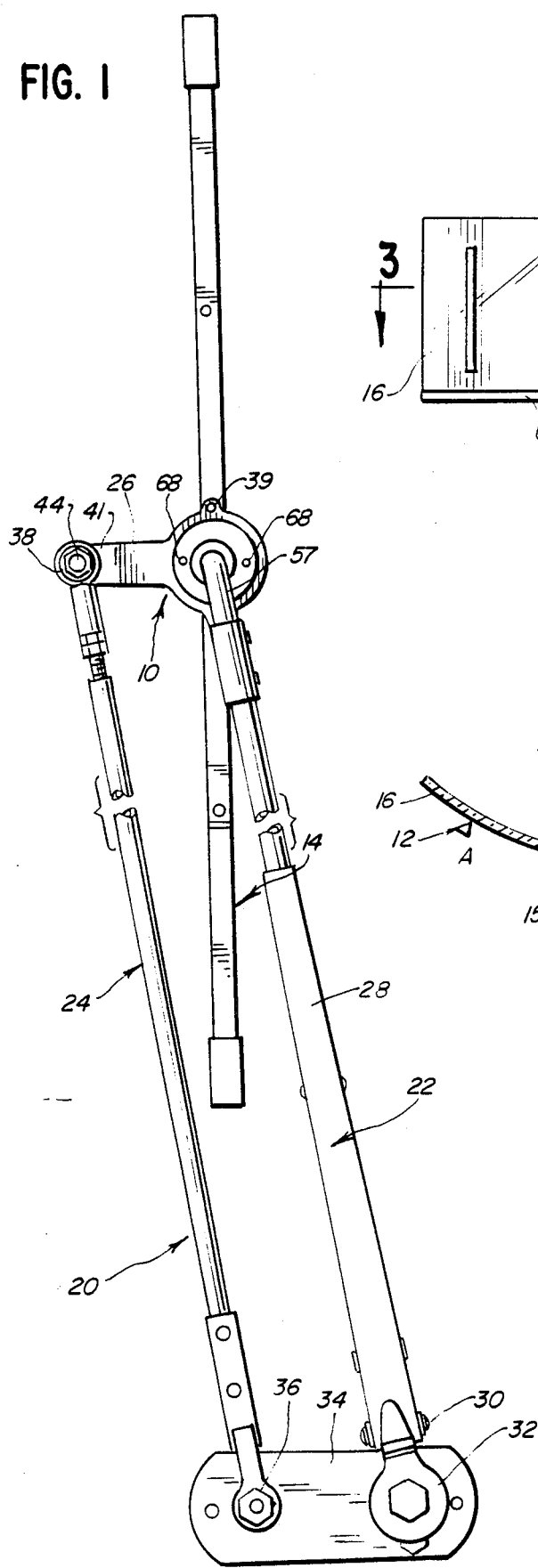
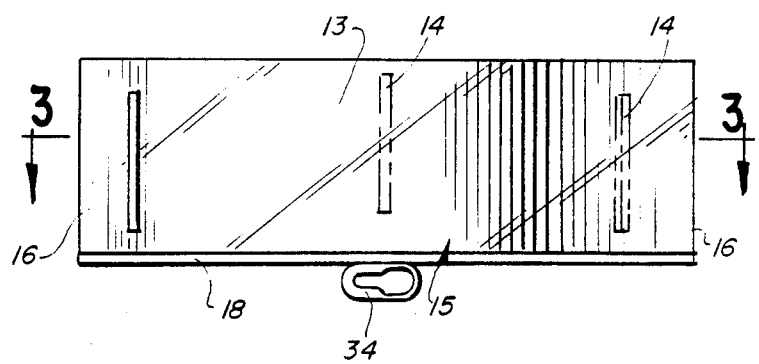
FIG. 1
FIG. 2
FIG. 3

ATTACK ANGLE COMPENSATOR CONNECTOR

BACKGROUND OF THE INVENTION

1. Field of the Invention

This invention relates to windshield wipers and more particularly to the connection between a wiper arm and a wiper blade for holding the blade in a plane substantially perpendicular to the underlying surface of the windshield as the wiper arm traverses an arc across the windshield.

2. Background of the Invention

Wrap around windshields have presented a serious challenge to the windshield wiper industry. Normally, the main portion of the windshield is substantially flat or only moderately curved and falls away relatively sharply at the outboard portions thereof. It has been recognized for some time that most wrap around windshields have straight or only moderately curved components in a direction along a line perpendicular to the lower belt line of the windshield, but have curvatures in a plane parallel to the belt line of the windshield that varies from moderately curved to sharply curved. Conventional wiper blades that are connected to a wiper arm so that they function along a line generally parallel to the wiper arm are not able to completely conform to the sharply curved side portions of the windshield so that the outboard sides of the windshield remain unwiped. To overcome this problem, wiper arms having a parallelogram linkage were developed whereby the wiper blade was held substantially perpendicular to the lower belt line as it is moved across the windshield. In this way, the wiper blade flexes along its length relatively little as it wipes the windshield. However, at the outboard ends of the wipe pattern, the windshield curves away from the wiper blade so that the blade is not perpendicular to the surface of the windshield, resulting in less than a satisfactory wipe. Attempts have been made to provide a mechanism for changing the attitude of the wiper blade so as to maintain the blade perpendicular to the surface of the windshield being wiped even at the outboard reaches of the windshield.

One such attempt is disclosed in U.S. Pat. No. 3,292,200 to Scinta. In Scinta, a segmented wiper arm is provided which allows pivoting of the blade-carrying section of the arm about an axis that is transverse to the arm length. The blade-carrying section is spring biased to urge the wiper blade about the pivot conformingly against the windshield. This construction does not lend itself to incorporation into a pantograph type assembly, wherein the orientation of the wiper blade is maintained constant. Further, the two-diemensional pivoting can conform the blade to only a limited number of windshield configurations.

Another proposed solution is disclosed in U.S. Pat. No. 3,180,757 to Wise. In Wise, a component carried by a housing on the wiper blade has an internal groove for accepting an entering part on a wiper arm, which part is curved to correspond to the curvature of the internal groove in the housing. The entering part and groove cooperate to effect multi-dimensional adjustment between the wiper arm and blade to hold the blade in a plane perpendicular to the windshield. Because of the relative movement required between the entry member and the blade component, the connection might be prone to jamming, causing the wiper blade to be ineffectual on either the curved or flat portions of the windshield.

The present invention is specifically directed to overcoming one or more of the above enumerated deficiencies known in the prior art.

SUMMARY OF THE INVENTION

According to the invention, an improved connector is provided between the wiper arm and blade. The wiper arm has a pantograph of parallelogram linkage with a trunnion member which cooperates with a cam surface in a socket associated with the wiper blade. Upon relatively rotating the wiper arm and blade, the trunnion travels along the cam surface and causes the blade to be reoriented relative to the windshield in a predetermined fashion, depending upon the configuration of the windshield.

One principal object of the invention is to provide a simple yet positive, durable connector between a wiper arm and blade to conform the wiping portion of the wiper blade consistently along the extent of the windshield of the wrap around type. In a preferred form, the windshield wiper arm structure is in the form of a pantograph or parallelogram, which maintains constant vertical orientation of the wiper blade along a line generally perpendicular to the lower belt drive of the windshield. The trunnion has a round body with arms which engage cam surface defined by a two part socket. The socket and trunnion cooperate to effect a positive and smooth reorientation of the wiper blade between the flat and curved portions of the windshield so that the plane of the wiper blade is perpendicular to the surface being wiped.

Additional objects and advantages of the invention will become apparent upon reading the following detailed description in conjunction with the claims and the annexed drawings.

BRIEF DESCRIPTION OF DRAWINGS

FIG. 1 shows a pantograph wiper assembly incorporating an attack angle compensator connector according to the invention;

FIG. 2 is a front, elevation view of a windshield showing a wiper blade in several positions therealong as controlled by the system of FIG. 1;

FIG. 3 is a sectional view of the windshield and wiper blade along line 3—3 of FIG. 2;

DETAILED DESCRIPTION OF DRAWINGS

Figure 4:
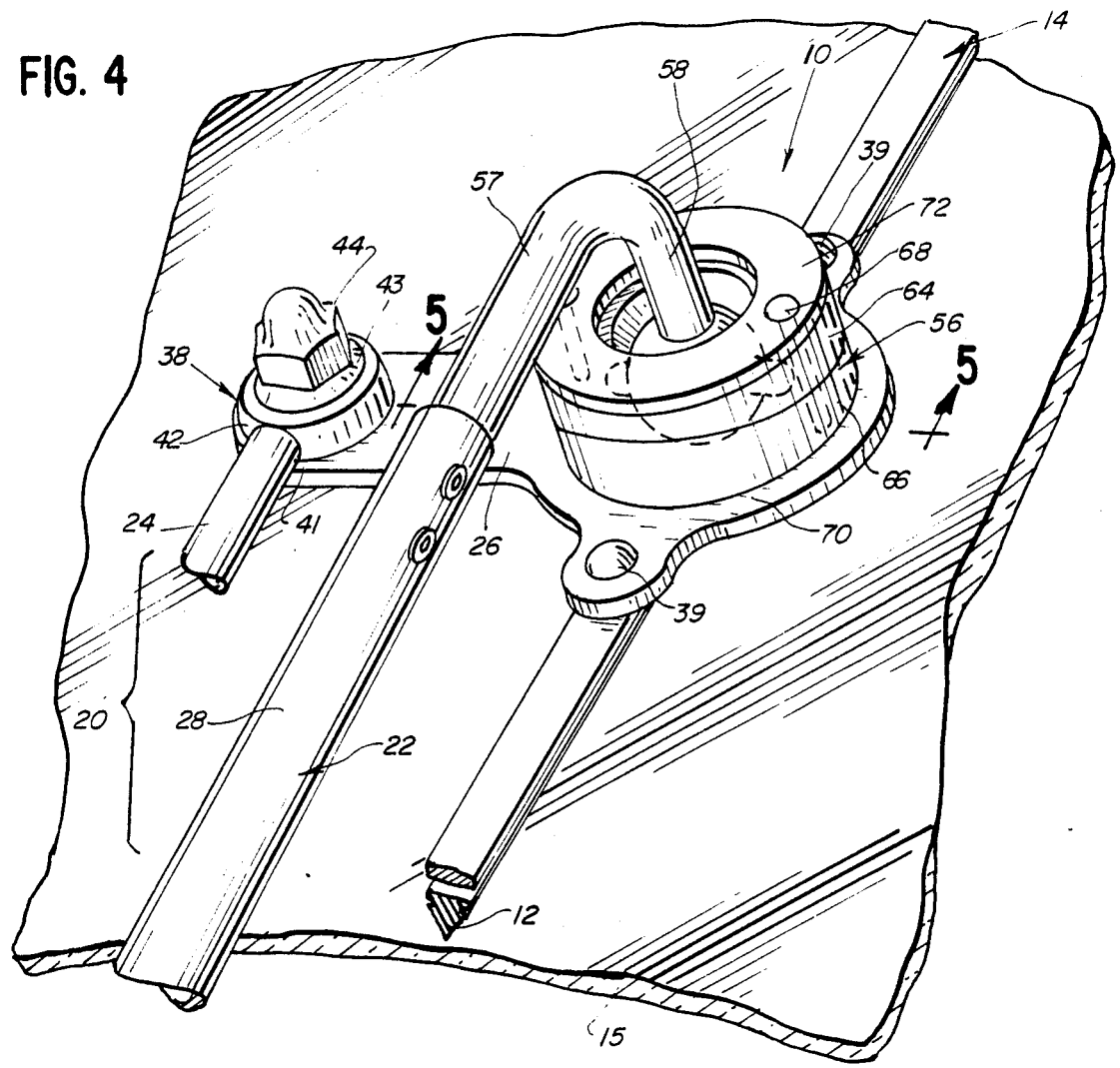
FIG. 4 is a perspective view of a preferred form of attack angle compensator connector between a wiper arm and blade with the blade operatively associated with a windshield.
Figure 7:
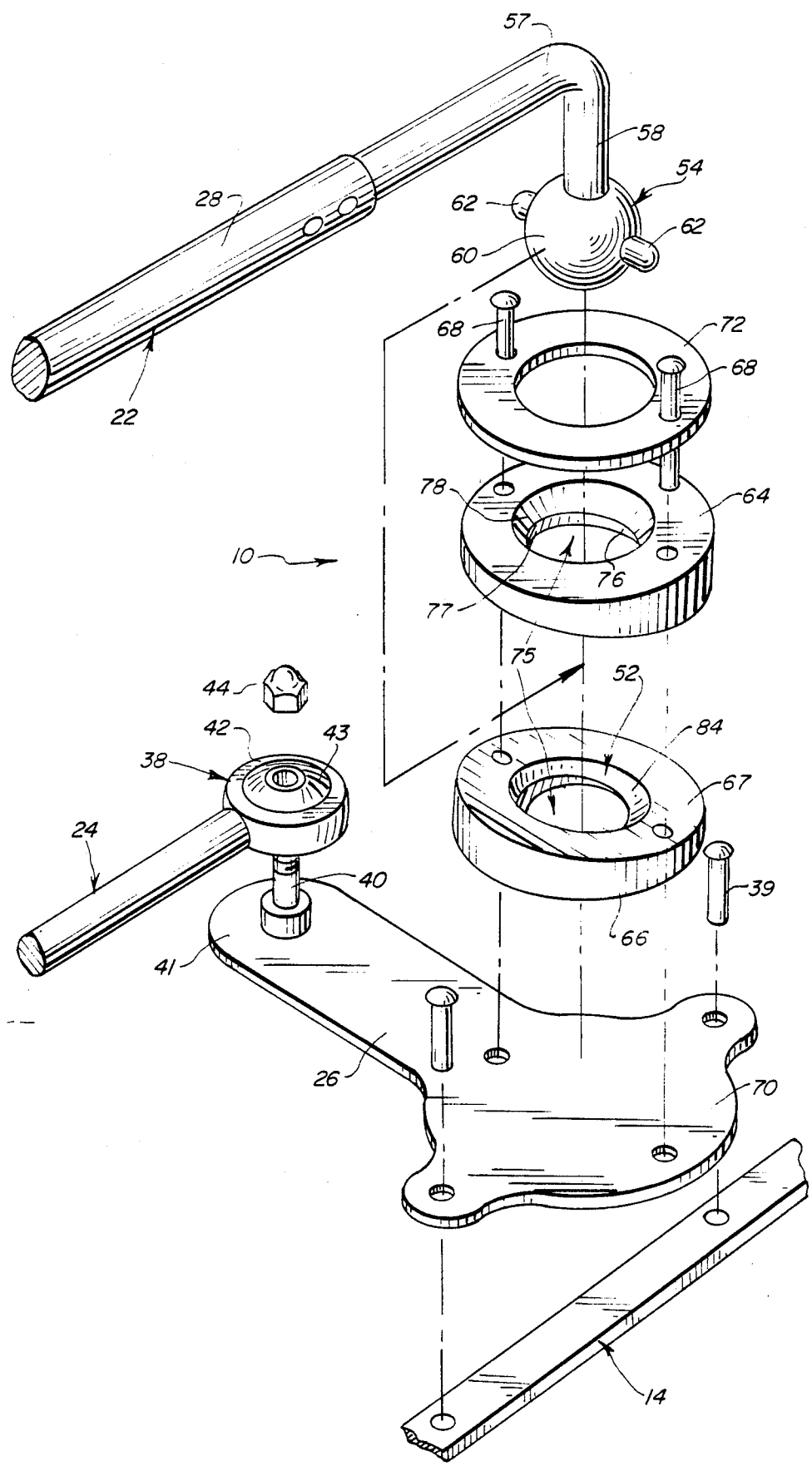
FIG. 7 is an exploded, perspective view of the attack angle compensator connector of FIG. 4.

FIGS. 1, 4 and 7 disclose a pantograph type windshield wiper assembly incorporating a preferred form of attack angle compensator connector 10 according to the invention, arranged to conform a wiping portion 12 of a wiper blade 14 to a curved or wrap around windshield 15 of the type illustrated in FIGS. 2 and 3. The wrap around windshield 15 in FIGS. 2 and 3 comprises a convex front surface or midportion 13 which curves rearwardly toward the lateral outboard portions 16. The windshield 15 is substantially flat or only moderately curved along lines perpendicular to the lower belt bar 18 of the windshield and at the midportion 13 is moderately curved along lines parallel to the lower belt bar 18. The outboard or side portions 16 of the windshield curve or fall away relatively sharply along the lines parallel to the lower belt bar 18.

The desired relationship between the wiper assembly and the windshield is demonstrated by the conventional triangular shaped squeegee or wiping portion 12 shown in positions A, B and C in FIG. 3 along the windshield 15. In each position, the squeegee 12 lies in a plane that is substantially perpendicular to the belt line and perpendicular to the tangent of the windshield at the point of contact.

The pantograph arrangement 20, disclosed in FIGS. 1, 4 and 7 is responsible for maintaining the vertical or perpendicular-to-the-belt-line orientation of the wiper blade 14. The linkage of the pantograph 20 comprises a wiper arm 22, an idler arm 24 and a coupler or mounting plate 26. The wiper arm 22 is comprised of an elongate section 28 pivotally mounted by a pin 30 to a mounting head 32 affixed on a drive shaft (not shown) extending through the panel 34 adjacent the lower belt bar 18 of the windshield. The axis of the pin 30 is perpendicular to the plane containing the longitudinal axis of the wiper arm 22 and the longitudinal axis of the drive shaft (not shown). The idler arm 24 is pivotally mounted to the panel 34 by a ball joint 36. The spacing between a ball joint 36 and the drive shaft for the mounting head 32 is equal to the spacing between the ball joint 38 joining the idler arm 24 to the mounting plate 26 and the junction between the arm 22 and the mounting plate 26 so that the linkage is a parallelogram. The plate 26 has a threaded stud 40 secured to and projecting upwardly from an outer end portion 41 thereof. The ball joint 38 on the idler arm 24 has a socket 42 attached to the end of the idler arm with a ball 43 of the ball joint seated in the socket 42 and being secured to the stud 40 by a cap nut 44. The ball joints 36 and 38 are substantially identical in construction. With the wiper blade 14 affixed to the coupler plate 26 by rivets 39, the pantograph linkage will maintain the wiper blade in a plane that will remain perpendicular to the lower edge of the windshield or to the belt bar 18 as the wiper arm reciprocates the blade across the surface of the windshield.

The invention is directed to an attack angle compensator connector 10 between the wiper arm 22 and the coupler plate 26 on the wiper blade 14.

Details of the attack angle compensator connector 10 are shown most clearly in FIGS. 4–7. The attack angle compensator connector 10 comprises essentially a trunnion 54 which cooperates with a two part cam socket member 56 defining an internal cam surface or cam slot 52.

The elongate section 28 of the wiper arm 22 has an extension 57 which has a right angle bend defining offset leg 58 that is affixed to a spherical trunnion ball 60. The ball has diametrically oppositely protruding follower arms 62 which are guidingly received within the cam slot 52 of the cam socket member 56. The arm extension 57, the trunnion ball 60 and follower arms 62 are all preferably die cast.

The socket member 56 has first and second mating parts, 64,66 respectively, which may be made of nylon or equivalent material. Each of the parts 64,66 is wedge-shaped with mating sloping surfaces 65,67 respectively, so that when the surfaces 65,67 abut each other and are closely drawn together as by bolts 68, the tendency to shift is minimized. The parts 64,66, when assembled together, cooperatively define a cylindrical outer configuration, are captured against a flat surface 70 on the mounting plate 26 as by an overlying retaining ring 72, have a vertical opening 75 centrally formed therein, and cooperatively define the cam surface or cam slot 52 for predetermined controlled, guiding movement of the cam follower arms 62. It should be noted that the socket member 56 is divided into the two parts 64,66 along a common plane that is angularly disposed to the vertical axis of the cylindrical configuration forming the socket member. The angle of the plane to the vertical axis is selected to provide the desired range of attack angles to the blade as will appear more clearly hereinafter.

Figure 5:
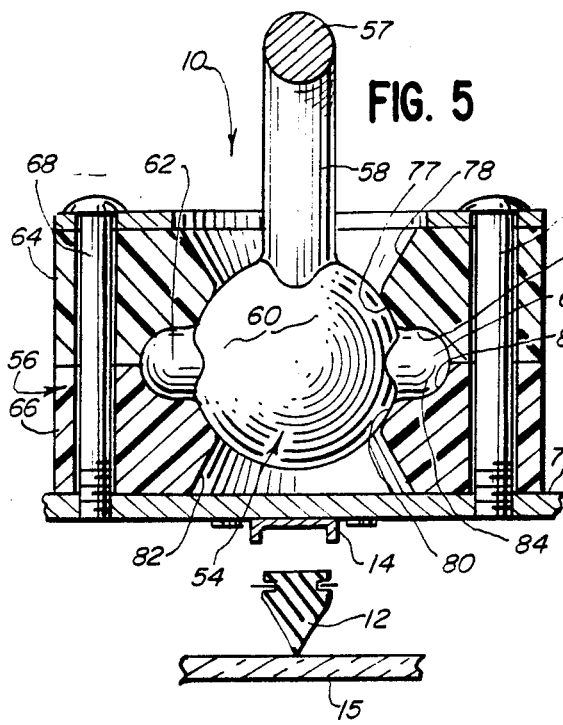
FIG. 5 is a sectional view of the attack angle compensator connector along line 5—5 of FIG. 4 with the blade traversing a flat portion of the windshield.
Figure 6:
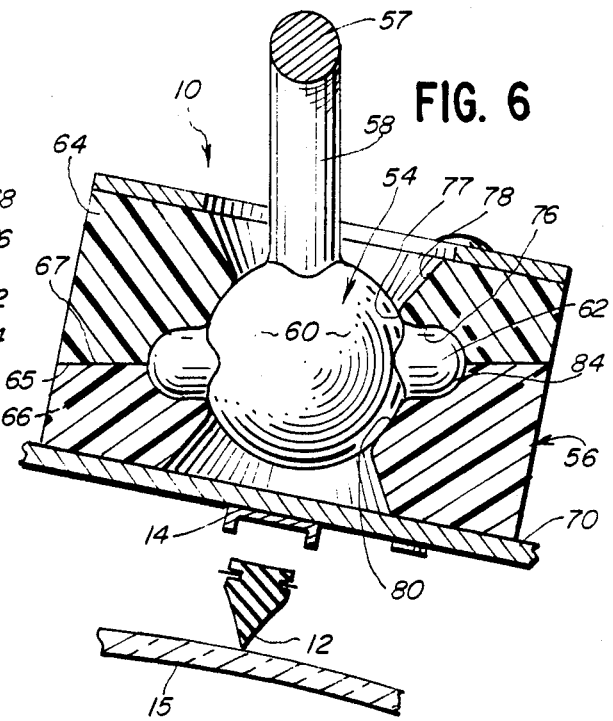
FIG. 6 is a view similar to that in FIG. 5 with the blade on a curved portion of the windshield.

The parts 64,66 each have three contiguous internal surfaces defining the vertical opening 75 in the socket member 56 best seen in FIGS. 5 and 6. Part 64 has a tapered wall 78 extending in a converging manner from the top surface of the part toward the midportion thereof. The tapered wall 78 joins with a spherical portion 77, which spherical portion is of a diameter to mate with the diameter of the trunnion ball 60. The spherical portion 77 joins with the upper half of the cam slot 52, which upper half if formed as an annular groove 76 around the edge of the opening 75 in the part 64. The socket part 66 has a tapered wall 82 converging from the bottom surface of the part 66, has a spherical portion 80 joined with the tapered wall 82 and which spherical portion 80 joins with the lower half of the cam slot 52, which lower half is formed as an annular groove 84 around the edge of the opening 75. With the parts 64,66 assembled, the trunnion ball 60 can swivel in the spherical portions 77,80 with the cam follower arms 62 in the cam slot 52 and with the leg 58 of the arm extension 52 freely gimboling in the cone-shaped entry (formed by the tapered wall 78) of the socket member 56. The tapered wall 78 prevents interference between the leg 58 and the socket member 56 throughout the range of relative movement between the socket member 56 and the trunnion 54.

The particular slot configuration depends on the shape of the windshield and can be adapted to virtually any wrap around configuration. In the disclosed arrangement, the socket parts 64,66 are identical and inverted axially to define the cam slot 52.

With some windshield configurations it may be desirable to shape the cam slot 52 in a wavy pattern (i.e. out of a plane) so as to provide the necessary camming action to rotate the plane of the blade to be substantially perpendicular to the windshield throughout the full wiping pattern.

In operation, and as is intended in the version shown on FIGS. 2 and 3, the wiper arm assembly 20 is mounted on the panel below the windshield at substantially the midportion 13 of the windshield. With the pantograph arm assembly 20 holding the blade 14 in position B, the blade 14 will align substantially in a plane that is parallel to the arm 28, perpendicular to the belt line 18 and perpendicular to the surface of the midportion 13 of the windshield. As the arm is driven outboard to the right in FIGS. 2 and 3, the pantograph linkage will maintain the plane of the blade perpendicular to the belt line and will open up an angle between the plane of the blade and the plane of the arm 28. Opening the angle between the blade 14 and the arm 28 will cause the trunnion 60 to pivot relative to the parts 64,66, moving the follower arms 62 in the cam slot 52 to force the coupler plate 26 and the plane of the wiper blade to rotate about the center of the trunnion. The shape of the cam slot 52 is such that the rotation of the plane of the wiper blade will maintain the plane of the blade perpendicular to the surface of the windshield at the line of contact of the wiping portion of the blade with the windshield. The idler arm 24, being mounted by ball joints 36,38 to the panel 34 and to the coupler plate 26 accommodates to the trapped roll of the blade affixed to the coupler plate 26. Since the cam slot 52 is symmetrical about the vertical plane of the wiper blade, the same motion of the blade will be effected on the travel of the arm to the left in FIGS. 2 and 3, with the plane of the blade rotating in the other direction to retain the blade perpendicular to the surface being wiped.

It is to be understood that the foregoing description was made for purposes of clarifying the structure and the operation of the present invention with no unnecessary limitations to be derived therefrom.

We claim:

1. An attack angle compensator connector for connecting a windshield surface treating blade to a reciprocably pivoting wiper arm so as to conform the blade to a contoured windshield surface upon pivoting of the wiper arm, said attack angle compensator connector comprising:
    a trunnion member fixedly associated with one of either the wiper arm or the blade and having a fixed ball portion;
    a socket means fixedly associated with the other of either the wiper arm or the blade and defining a curved seat to accept the ball portion adjustably within the socket for limited, multidimensional rotary motion; and
    means cooperating between the trunnion member and socket means for effecting controlled, predetermined movement of the fixed ball portion of the trunnion member within the socket means upon pivoting of the wiper arm and thereby adjusting the blade relative to the windshield surface.

2. The attack angle compensator connector according to claim 1 wherein said socket means comprises at least two mating parts which cooperatively capture the trunnion member and define said curved seat and a cam slot, the trunnion member has a follower arm which is guided in the cam slot upon pivoting of the wiper arm to effect said predetermined movement of the fixed ball portion of the trunnion member within the socket means.

3. The attack angle compensator connector according to claim 1 wherein said wiper arm pivots about a first point on a vehicle, an idler link pivots at one end about a point on the vehicle spaced from the first point, a plate rigidly connected to the socket means and to the wiper blade, the end of the idler link opposite the one end is pivotally connected to the plate so as to define a pantograph type linkage through which the orientation of the wiper blade relative to the edge of the windshield is maintained constant throughout the pivoting range of the wiper arm.

4. An attack angle compensator connector for connecting a windshield surface treating blade to a reciprocably pivoting wiper arm so as to conform the blade to a contoured windshield surface upon pivoting of the wiper arm, said attack angle compensator connector comprising:
    a trunnion member fixedly associated with one of either the wiper arm or the blade;
    a socket means fixedly associated with the other of either the wiper arm or the blade and retaining the trunnion member for limited, multidimensional rotary motion,
    said socket means comprising at least two mating parts which cooperatively capture the trunnion member and define a cam slot;
    means acting between the trunnion member and socket means for effecting controlled, predetermined movement of the trunnion member within the socket means upon pivoting of the wiper arm and thereby adjusting the blade relative to the windshield surface,
    said trunnion means comprising a ball having diametrically oppositely extending follower arms which cooperatively guide movement of the trunnion relative to the socket means, one said follower arm being guided in the cam slot upon pivoting of the wiper arm to effect said predetermined movement of the trunnion member within the socket means.

5. An attack angle compensator connector for connecting a windshield surface treating blade to a reciprocably pivoting wiper arm so as to conform the blade to a contoured windshield surface upon pivoting of the wiper arm, said attack angle compensator connector comprising:
    a trunnion member fixedly associated with one of either the wiper arm or the blade;
    a socket means fixedly associated with the other of either the wiper arm or the blade and retaining the trunnion member for limited, multidimensional rotary motion,
    said socket means comprising at least two mating parts which cooperatively capture the trunnion member, define a cam slot, are substantially identical and are axially inverted in assembled relationship; and
    means acting between the trunnion member and socket means for effecting controlled, predetermined movement of the trunnion member within the socket means upon pivoting of the wiper arm and thereby adjusting the blade relative to the windshield surface,
    said trunnion member having a follower arm which is guided in the cam slot upon pivoting of the wiper arm to effect said predetermined movement of the trunnion member within the socket means.

6. An attack angle compensator connector for connecting a windshield surface treating blade to a reciprocably pivoting wiper arm to conform the blade to a contoured windshield surface upon pivoting of the wiper arm, said attack angle compensator connector comprising:
    a trunnion ball fixed to an end of the wiper arm and having a radially extending follower;
    a socket means fixedly associated with the blade, retaining the trunnion ball for limited, universal, relative, rotary motion and defining a cam slot for guiding the follower for predetermined relative movement between the trunnion ball and the socket means upon pivoting of the wiper arm to maintain the blade perpendicular to said windshield surface.

7. The attack angle compensator connector according to claim 6 wherein said socket means is fabricated from a plastic material.

8. The attack angle compensator connector according to claim 6 wherein said wiper arm has a perpendicularly offset end which is integral with the trunnion ball.

9. The attack angle compensator connector according to claim 6 wherein the wiper arm is a pantograph arm having the trunnion ball on the arm in operative engagement with the socket means on the blade.

10. The attack angle compensator connector according to claim 9 wherein the pantograph arm drives the blade so that the plane of the blade is substantially perpendicular to an edge of the windshield.

11. The attack angle compensator connector according to claim 9 wherein the pantograph arm moves the trunnion ball relative to the socket means so as to maintain the plane of the blade perpendicular to the surface of the windshield in contact with the edge of the wiper blade.

* * * * *